United States Patent
Huth et al.

(10) Patent No.: US 11,396,449 B2
(45) Date of Patent: Jul. 26, 2022

(54) METHOD FOR CHECKING A SENSOR VALUE OF A MEMS SENSOR

(71) Applicant: Robert Bosch GmbH, Stuttgart (DE)

(72) Inventors: Christopher Huth, Leonberg (DE); Oliver Willers, Korb (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 16/685,182

(22) Filed: Nov. 15, 2019

(65) Prior Publication Data
US 2020/0172392 A1 Jun. 4, 2020

(30) Foreign Application Priority Data
Dec. 4, 2018 (DE) .......................... 102018220936.7

(51) Int. Cl.
| | |
|---|---|
| *B81B 7/00* | (2006.01) |
| *G06F 21/55* | (2013.01) |
| *G01P 21/00* | (2006.01) |

(52) U.S. Cl.
CPC ............ *B81B 7/0012* (2013.01); *G01P 21/00* (2013.01); *G06F 21/552* (2013.01); *B81B 2207/03* (2013.01); *G06F 2221/034* (2013.01)

(58) Field of Classification Search
CPC ............ G06F 21/552; G06F 2221/034; B81C 99/0045
See application file for complete search history.

(56) References Cited

U.S. PATENT DOCUMENTS

| | | | |
|---|---|---|---|
| 5,640,133 A | 6/1997 | MacDonald et al. | |
| 2012/0209545 A1* | 8/2012 | Humphries | ............ G01H 13/00 702/56 |
| 2018/0288546 A1* | 10/2018 | Lesso | ...................... G01N 29/46 |
| 2019/0186917 A1* | 6/2019 | Dakshinamurthy | ........................ G01C 19/5776 |

(Continued)

FOREIGN PATENT DOCUMENTS

| | | |
|---|---|---|
| DE | 4000903 C1 | 8/1990 |
| DE | 4022495 A1 | 1/1992 |

(Continued)

OTHER PUBLICATIONS

Yunmok Son, Rocking Drones with Intentional Sound Noise on Gyroscopic Sensors, Proceedings of the 24th USENIX Security Symposium Aug. 12-14, 2015 • Washington, D.C., pp. 881-896. (Year: 2015).*

(Continued)

*Primary Examiner* — Michael J Dalbo
(74) *Attorney, Agent, or Firm* — Norton Rose Fulbright US LLP; Gerard Messina

(57) ABSTRACT

A method is provided for checking a sensor value of a MEMS sensor. In the process, an output signal of the MEMS sensor is detected and the sensor value is ascertained as a function of the output signal. In addition, frequency components of the output signal are examined and a determination is made as to whether the ascertained sensor value is reliable or unreliable as a function of the examination of the frequency components. If the sensor value is determined to be unreliable, the sensor value is discarded or provided with a lower weighting, or a warning it output relating to the unreliability of the sensor value or an item of information about the unreliability of the sensor value is stored.

14 Claims, 3 Drawing Sheets

(56) References Cited

U.S. PATENT DOCUMENTS

2019/0196481 A1* 6/2019 Tay .................. G01S 17/86
2020/0387610 A1* 12/2020 Nashimoto ............ G01D 21/00

FOREIGN PATENT DOCUMENTS

DE    102012218906 A1    4/2014
DE    102017205984 A1    10/2018

OTHER PUBLICATIONS

Timothy Trippel et al., "Walnut: Waging Doubt on the Integrity of MEMS Accelerometers With Acoustic Injection Attacks" In Security and Privacy (EUROS&P), 2017 IEEE European Symposium on pp. 3-18. IEEE, 2017.
Chihwan Jeong et al., "A Study on Resonant Frequency and Q Factor Tunings for MEMS Vibratory Gyroscopes", Journal of Micromechanics and Microengineering, pp. 1530-1536, 2004.
Grant Roth, "Simulation of the Effects of Acoustic Noise on MEMS Gyroscopes", Phd Thesis, pp. 1-120, 2009.
Pregassen Soobramaney, "Mitigation of the Effects of High Levels of High-Frequency Noise on MEMS Gyroscopes", Phd Thesis, pp. 1-200, 2013.
Yunmok Son et al., "Rocking Drones with Intentional Sound Noise on Gyroscopic Sensors", in USENIX Security Symposium, p. 881-896, 2015.

\* cited by examiner

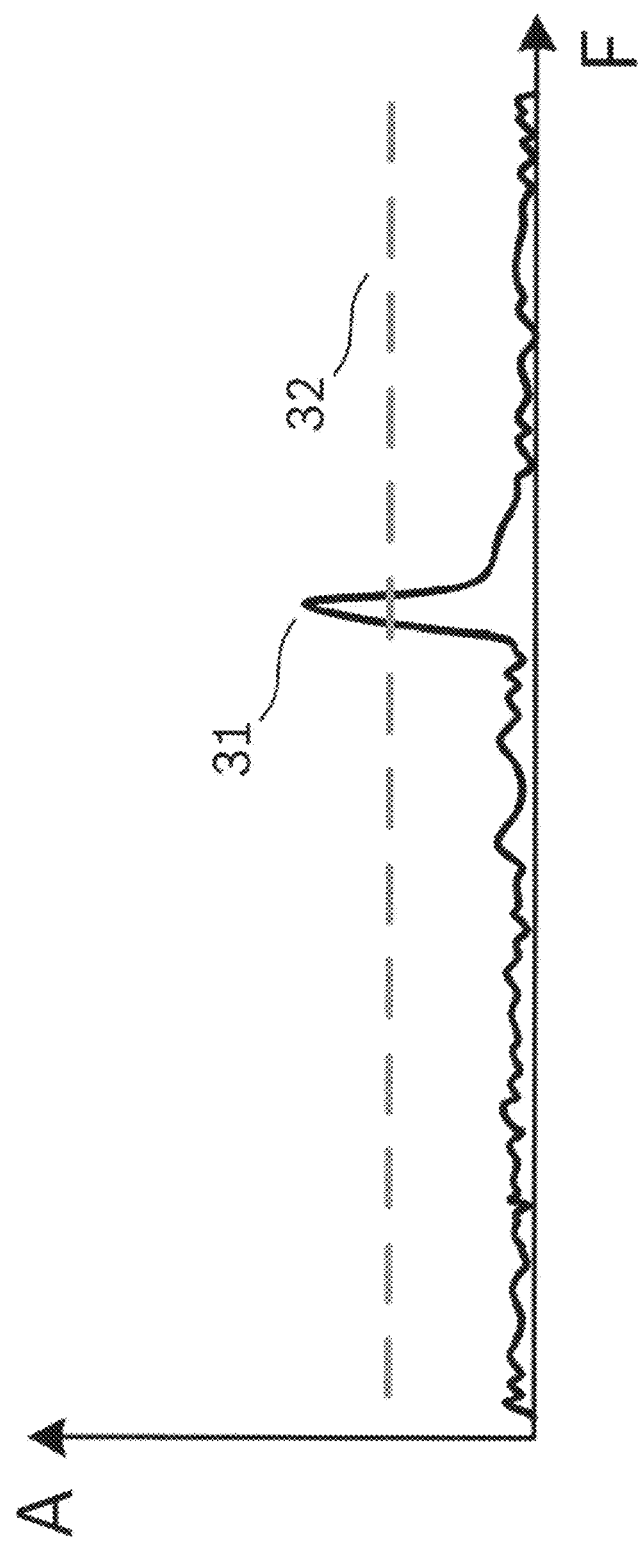

METHOD FOR CHECKING A SENSOR VALUE OF A MEMS SENSOR

CROSS REFERENCE

The present application claims the benefit under 35 U.S.C. § 119 of German Patent Application No. DE 102018220936.7 filed on Dec. 4, 2018, which is expressly incorporated herein by reference in its entirety.

FIELD

The present invention relates to a method for checking a sensor value of a MEMS sensor as well as to a computer program set up for this purpose.

BACKGROUND INFORMATION

Microsystems (microelectromechanical systems/MEMS) have become ever more important over the past few years. MEMS sensors, e.g., MEMS-based inertial sensors, are used in countless electronic devices and systems.

For example, micromechanical acceleration sensors are described in German Patent No. DE 400 0903 C1 and German Patent Application No. DE 10 2012 218906 A1. Micromechanical yaw rate sensors are described in German Patent Application No. DE 402 2495 A1 and German Patent Application No. DE 10 2017 205 984 A1, for instance.

In the publication "Yunmok Son, Hocheol Shin, Dongkwan Kim, Young-Seok Park, Juhwan Noh, Kibum Choi, Jungwoo Choi, Yondae Kim, et al.; Rocking Drones with Intentional Sound Noise on Gyroscopic Sensors, in USENIX Security Symposium, p. 881-896, 2015", a successful attack by sound waves on a MEMS gyroscope was illustrated, which particularly leads to a denial of service, i.e., renders the sensor useless.

Going even further is an attack by sound waves on the MEMS acceleration sensor of a smartphone, which was introduced in "Timothy Trippel, Ofir Weisse, Wenyuan Xu, Peter Honeyman, and Kevin Fu; Walnut: Waging Doubt on the Integrity of MEMS Accelerometers with Acoustic Injection Attacks, in Security and Privacy (EuroS&P), 2017 IEEE European Symposium on pages 3-18. IEEE, 2017". Here, the attack was successful in selectively manipulating sensor output signals.

Depending on the use of the sensors, such attacks on MEMS sensors may pose a serious threat. For instance, MEMS inertial sensors may supply safety-relevant data in vehicles or airplanes, e.g., for driver assistance systems such as ABS or ESP, for safety systems such as airbags, as well as for functions in the context of automated driving.

To protect against such attacks, a feedback capacity could be connected to a sensor electrode in order to influence the resonant frequency and the resonance effect of the sensor, as described in U.S. Pat. No. 5,640,133 A and the publication "Chihwan Jeong, Seonho Seok, Byeungleul Lee, Hyeonched Kimn, and Kukjin Chun; A Study on Resonant Frequency and Q Factor Tunings for MEMS Vibratory Gyroscopes. Journal of Micromechanics and Microengineering, 14(11): 1530, 2004".

The publication "Grant Roth. Simulation of the Effects of Acoustic Noise on MEMS Gyroscopes; PhD thesis, 2009" proposes as a simple and advantageous defense to surround a gyroscope with foam.

In the publication "Pregassen Soobramaney; Mitigation of the Effects of High Levels of High-Frequency Noise on MEMS Gyroscopes; PhD thesis, 2013", an additional structure is described which responds to resonant frequencies and reduces an influencing of a gyroscope output by resonances.

SUMMARY

A method is provided for checking a sensor value of a MEMS sensor. In particular, the MEMS sensor may be an inertial sensor such as an acceleration sensor, a yaw rate sensor or a gyroscope. However, the present method is also able to be used in a pressure sensor, a humidity sensor, a temperature sensor, a magnetic field sensor or a gas sensor.

An output signal of the MEMS sensor is detected and the sensor value is ascertained as a function of the output signal. For checking purposes, it is now provided to examine frequency components of the output signal and to make a determination as to whether the ascertained sensor value is reliable or unreliable as a function of the examination of the frequency components. If the sensor value is determined to be unreliable, then the sensor value is discarded or provided with a lower weighting, a warning is output about the unreliability of the sensor value, or an item of information relating to the unreliability is stored.

In this way the integrity of the sensor or its output signals is able to be checked in an uncomplicated manner without having to modify the sensor structure and usually without adapting a hardware of the sensor or the allocated evaluation circuits. As a whole, this provides an improved, i.e., more reliable, sensor system. The detection of unreliable sensor values may entail different reactions. The safest may be the discarding of the sensor value. In the case of sensor fusions, e.g., in redundant systems, a lower weighting of the potentially unreliable sensor signal may be the technically more meaningful solution. In the area of less safety-relevant functions, for example, an output warning or storing may be sufficient, in particular for diagnostic purposes.

In one advantageous embodiment, the frequency components are examined for natural resonances of sensor structures of the MEMS sensor. As described earlier, many currently known attacks were focused on natural resonances. Such attacks are able to be identified in an efficient manner with the aid of such an examination.

The frequency components of at least one segment of a frequency spectrum of the output signal are advantageously able to be examined. Instead of examining only individual frequencies, this makes it possible to look at a multitude of frequencies of an entire frequency segment, which normally allows for more precise conclusions about the probability of an attack.

However, for a particularly easily implementable but reliable decision as to whether a sensor value is unreliable, especially the determination of an exceeding of threshold values is an option. For example, exceeded threshold values for the amplitudes at certain frequencies or in certain frequency ranges may point to an acoustic attack or to acoustic interference. Individual amplitudes or also amplitude mean values may be taken into account for this purpose.

In a further advantageous embodiment, certain patterns in the frequency spectrum may also be utilized for identifying acoustic attacks or interference.

The evaluation of the output signal is preferably performed with the aid of hardware circuits, which, for instance, digitally condition an analog output signal, and a computer program for analyzing the output signal with the aid of threshold value comparisons or a pattern detection, for example. The computer program may be stored in a memory of an evaluation circuit or a system allocated to the sensor or having the sensor, and be processed by a processing unit of the evaluation circuit or the system. This system may advantageously be a vehicle, an airplane, a robot or a mobile user terminal. It may be controlled as a function of the ascertained sensor value if the sensor value is detected as reliable. If not, then a suitable reaction may take place, in particular the discarding or lower weighting of the sensor value and/or the output of a corresponding warning and/or the storing of an item of information relating to the unreliability.

BRIEF DESCRIPTION OF THE DRAWINGS

Below, the present invention will be described in greater detail with reference to the figures and on the basis of exemplary embodiments.

FIG. 3 schematically shows an exemplary frequency spectrum of an output signal of a MEMS sensor.

DETAILED DESCRIPTION OF EXAMPLE EMBODIMENTS

Figure 1:
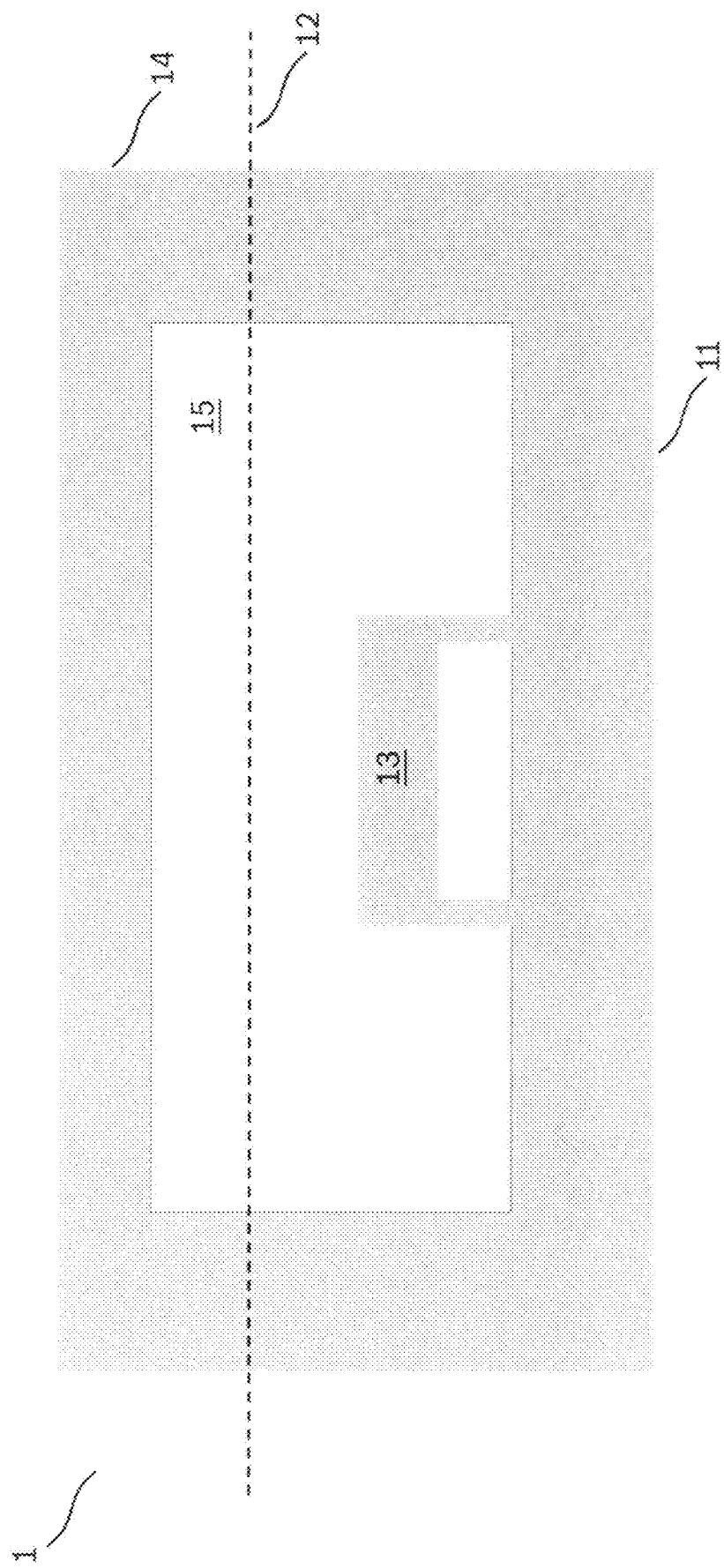
FIG. 1 schematically shows an exemplary MEMS sensor.

FIG. 1 shows a MEMS sensor 1. MEMS sensor 1 has a substrate wafer 11 whose delimitation from further layers 14 is illustrated by cut-off line 12. MEMS sensor 1 has additional layers 14, which enclose a cavity 15 by substrate wafer 11. Layers 14 may be connected to layers 11 with the aid of a bonding method. Layers 14 are also known as sensor caps. A vacuum is preferably created inside cavity 15. The actual, functional sensor structure 13 of MEMS sensor 1 is situated inside cavity 15 and on substrate wafer 11.

MEMS sensors such as MEMS acceleration sensors, MEMS yaw rate sensors or MEMS gyroscopes often have a large number of resonance modes due to their complex mechanical structure.

Attacks on MEMS sensors such as the ones already described above exploit that certain resonances are able to be excited from the outside, in particular by sound waves. Movable sensor structures may thereby be excited in a manner that is not desired for the operation. This may lead to undesired deflections of the structures, which in turn cause falsified output signals and thus incorrectly ascertained sensor values. For example, a stronger or reduced deflection of structures may therefore be detected in a capacitive manner and a faulty acceleration be detected in an acceleration sensor, for instance, or a faulty yaw rate in a yaw rate sensor.

MEMS acceleration sensors are typically set up in such a way that the resonance modes of the sensor structures are not excited during a normal operation in all possible operating states or under all possible operating conditions. In MEMS gyroscopes, the sensor structures oscillate at an operating frequency at a constant amplitude.

In order to check sensor values and in particular to detect interference by external sound sources such as external attacks using sound waves, it is now provided to examine frequency components of the output signal.

Figure 2:
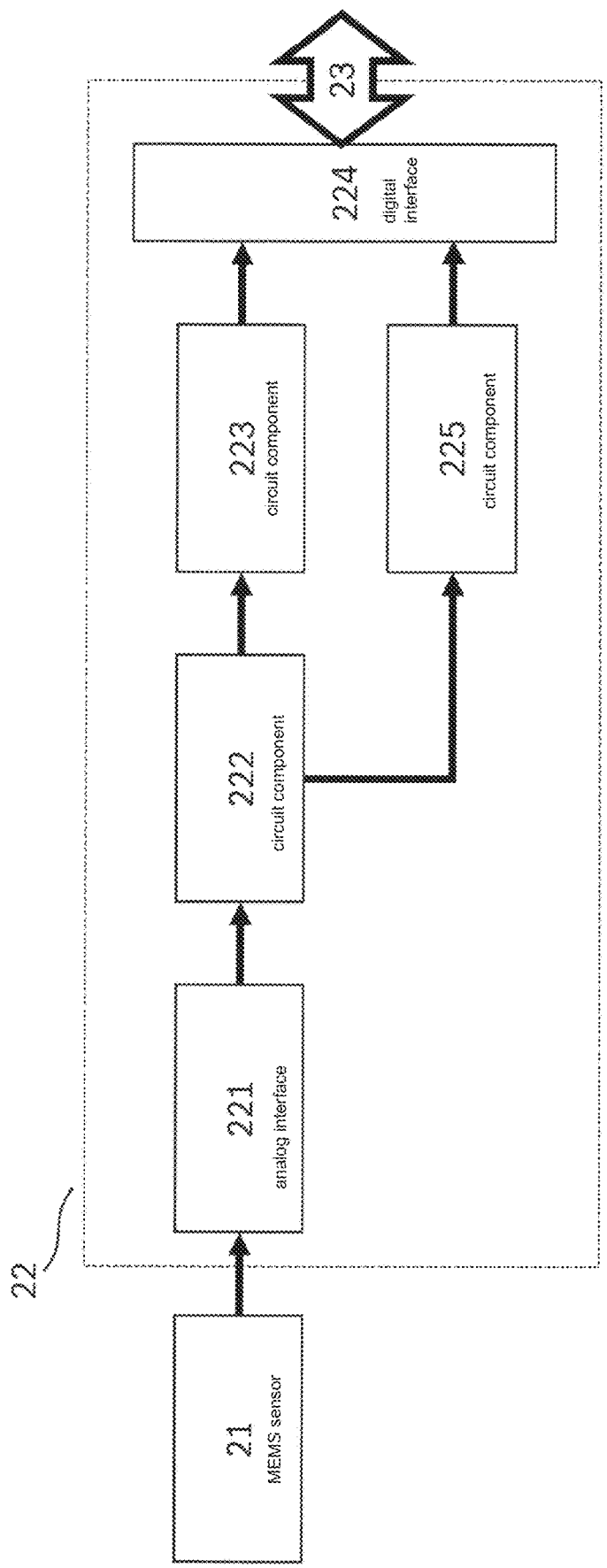
FIG. 2 schematically shows a block diagram for evaluating a MEMS sensor.

FIG. 2 schematically shows a MEMS sensor 21, which is connected to an evaluation circuit 22. Evaluation circuit 22 may be realized as an ASIC or a microcontroller. Evaluation circuit 22 includes an analog interface 221 by way of which the evaluation unit is able to communicate with sensor 21 and in particular is able to receive an output signal from sensor 21. The analog output signal is subjected to digital signal conditioning in downstream circuit component 222. A sensor value is determined in circuit component 223 as a function thereof, which is able to be forwarded via a digital interface 224.

In addition, e.g., in parallel, an examination of frequency components of the digitally conditioned output signal is carried out in circuit component 225 in order to determine the sensor values in circuit component 223. Depending on the examination, it may be determined whether the ascertained sensor values are reliable or unreliable. This information is also forwarded to digital interface 224.

Sensor 21 and evaluation circuit 22 may preferably be embedded in a technical system that further processes the sensor values of sensor 21 and indicates output values as a function thereof, or which is controlled as a function thereof or controls other units. The determination of the reliability or unreliability of sensor values is preferably taken into account in the process.

In particular, sensor 21 and evaluation circuit 22 may be embedded in a mobile user terminal such as a smartphone, in a vehicle, in an airplane or in a robot. The MEMS sensor may be an inertial sensor, in particular, such as an acceleration sensor, a yaw rate sensor or a gyroscope. In an advantageous manner, the provided method is able to be used in autonomous or partially autonomous systems, in particular.

The examination of frequency components may particularly include the examination of amplitudes of certain frequencies. For example, amplitudes of frequencies of a particular segment of the frequency spectrum are able to be examined or certain frequencies, e.g., frequencies of natural resonances. As a rule, an external excitation of certain modes that has an interfering effect on the output signal leads to a significant change in the frequency spectrum of the output signal and is able to be detected via this change. For example, characteristic values for the spectrum are able to be calculated or the spectrum be examined for characteristic patterns similar to digital fingerprints. In addition, certain threshold values may be defined, which should not be exceeded at certain frequencies or in certain frequency ranges.

An exemplary segment of a frequency spectrum of an output signal of a MEMS sensor is shown in FIG. 3, the Y axis being allocated to an amplitude A and the X axis being allocated to a frequency F of the output signal. A threshold value 32 for the amplitude is defined and plotted for the illustrated frequency range. It is selected in such a way that an exceeding in the observed frequency range suggests an interfering influence by external sound sources, so that a sensor value allocated to the output signal should therefore be detected as unreliable to be on the safe side. This is the case for peak 31 in FIG. 3 because it exceeds threshold value 32. Such a threshold value may either be discarded in its entirety by a system allocated to the sensor or at least be provided with a warning in the communication with the allocated system.

The described methods, in particular the examination of the frequency components of the output signal, are able to be realized in hardware, in software or partially in hardware and partially in software. Toward this end, in addition to or in place of the circuit components shown in FIG. 2, computer program parts stored in a memory are able to be processed by a processing unit.

What is claimed is:

1. A method for a MEMS sensor that is an inertial sensor configured to measure a movement, a pressure sensor configured to measure a pressure, a humidity sensor configured to measure humidity, a magnetic field sensor configured to measure a magnetic field characteristic, or a gas sensor configured to measure a characteristic of gas, the MEMS sensor being configured to output an output signal representing a value of the measurement, the method comprising the following steps:

detecting the output signal output by the MEMS sensor;

selecting one or more respective frequency components of the output signal that correspond to one or more respective resonance frequencies of elements of the MEMS sensor;

performing a comparison to determine whether at least one amplitude of the selected one or more respective frequency components is higher than a predefined non-zero threshold;

responsive to a result of the comparison being that the at least one amplitude is higher than the predefined non-zero threshold, determining that the output signal is attributed at least in part to an external acoustic attack and therefore unreliable for indicating the value of the measurement; and due to the determined unreliability of the output signal due to the attribution of the output signal at least in part to the external acoustic attack: (i) discarding the output signal entirely as an indication of the measured characteristic, or (ii) reducing a weighting of the output signal as a whole as the indication of the measured characteristic, or (iii) outputting a warning about the unreliability of the output signal as a whole as the indication of the measured characteristic, or (iv) storing an item of information indicating the unreliability of the output signal as a whole as the indication of the measured characteristic.

2. The method as recited in claim 1, wherein the selection is of at least one segment of a frequency spectrum of the output signal.

3. The method as recited in claim 2, wherein the comparison is performed by comparing an average of amplitudes of the at least one segment of the frequency spectrum of the output signal.

4. The method as recited in claim 1, wherein the MEMS sensor is the inertial sensor, the inertial sensor being an acceleration sensor, or a yaw rate sensor, or a gyroscope.

5. The method as recited in claim 1, wherein the MEMS sensor is the pressure sensor.

6. The method as recited in claim 1, wherein the MEMS sensor is the humidity sensor.

7. The method as recited in claim 1, wherein the MEMS sensor is the temperature sensor.

8. The method as recited in claim 1, wherein the MEMS sensor is the magnetic field sensor.

9. The method as recited in claim 1, wherein the MEMS sensor is the gas sensor.

10. A non-transitory machine-readable memory medium on which is stored a computer program that is executable by a computer and that, when executed by the computer, causes the computer to perform a method for a MEMS sensor that is an inertial sensor configured to measure a movement, a pressure sensor configured to measure a pressure, a humidity sensor configured to measure humidity, a magnetic field sensor configured to measure a magnetic field characteristic, or a gas sensor configured to measure a characteristic of gas, the MEMS sensor being configured to output an output signal representing a value of the measurement, the method comprising the following steps:

detecting the output signal output by the MEMS sensor;

selecting one or more respective frequency components of the output signal that correspond to one or more respective resonance frequencies of elements of the MEMS sensor;

performing a comparison to determine whether at least one amplitude of the selected one or more respective frequency components is higher than a predefined non-zero threshold;

responsive to a result of the comparison being that the at least one amplitude is higher than the predefined non-zero threshold, determining that the output signal is attributed at least in part to an external acoustic attack and therefore unreliable for indicating the value of the measurement; and due to the determined unreliability of the output signal due to the attribution of the output signal at least in part to the external acoustic attack: (i) discarding the output signal entirely as an indication of the measured characteristic, or (ii) reducing a weighting of the output signal as a whole as the indication of the measured characteristic, or (iii) outputting a warning about the unreliability of the output signal as a whole as the indication of the measured characteristic, or (iv) storing an item of information indicating the unreliability of the output signal as a whole as the indication of the measured characteristic.

11. A device having a processing unit and a non-transitory memory medium on which is stored a computer program that is executable by the processing unit for a MEMS sensor that is an inertial sensor configured to measure a movement, a pressure sensor configured to measure a pressure, a humidity sensor configured to measure humidity, a magnetic field sensor configured to measure a magnetic field characteristic, or a gas sensor configured to measure a characteristic of gas, the MEMS sensor being configured to output an output signal representing a value of the measurement, the computer program, when executed by the processing unit, causing the processing unit to perform the following steps:

detecting the output signal output by the MEMS sensor;

selecting one or more respective frequency components of the output signal that correspond to one or more respective resonance frequencies of elements of the MEMS sensor;

performing a comparison to determine whether at least one amplitude of the selected one or more respective frequency components is higher than a predefined non-zero threshold;

responsive to a result of the comparison being that the at least one amplitude is higher than the predefined non-zero threshold, determining that the output signal is attributed at least in part to an external acoustic attack and therefore unreliable for indicating the value of the measurement; and due to the determined unreliability of the output signal due to the attribution of the output signal at least in part to the external acoustic attack: (i) discarding the output signal entirely as an indication of the measured characteristic, or (ii) reducing a weighting of the output signal as a whole as the indication of the measured characteristic, or (iii) outputting a warning about the unreliability of the output signal as a whole as the indication of the measured characteristic, or (iv) storing an item of information indicating the unreliability of the output signal as a whole as the indication of the measured characteristic.

12. A vehicle, an airplane, a robot or a mobile user terminal having a MEMS sensor and a device having a processing unit and a non-transitory memory medium on which is stored a computer program that is executable by the processing unit and that, when executed by the processing unit, causes the processing unit to perform a method for the MEMS sensor, the MEMS sensor being an inertial sensor configured to measure a movement, a pressure sensor configured to measure a pressure, a humidity sensor configured to measure humidity, a magnetic field sensor configured to measure a magnetic field characteristic, or a gas sensor configured to measure a characteristic of gas, the MEMS sensor being configured to output an output signal representing a value of the measurement, the method comprising:

detecting the output signal output by the MEMS sensor;

selecting one or more respective frequency components of the output signal that correspond to one or more respective resonance frequencies of elements of the MEMS sensor;

performing a comparison to determine whether at least one amplitude of the selected one or more respective frequency components is higher than a predefined non-zero threshold;

responsive to a result of the comparison being that the at least one amplitude is higher than the predefined non-zero threshold, determining that the output signal is attributed at least in part to an external acoustic attack and therefore unreliable for indicating the value of the measurement; and due to the determined unreliability of the output signal due to the attribution of the output signal at least in part to the external acoustic attack: (i) discarding the output signal entirely as an indication of the measured characteristic, or (ii) reducing a weighting of the output signal as a whole as the indication of the measured characteristic, or (iii) outputting a warning about the unreliability of the output signal as a whole as the indication of the measured characteristic, or (iv) storing an item of information indicating the unreliability of the output signal as a whole as the indication of the measured characteristic.

13. A method for controlling a vehicle, an airplane, a robot or a mobile user terminal, using a MEMS sensor that is an inertial sensor configured to measure a movement, a pressure sensor configured to measure a pressure, a humidity sensor configured to measure humidity, a magnetic field sensor configured to measure a magnetic field characteristic, or a gas sensor configured to measure a characteristic of gas, the MEMS sensor being configured to output an output signal representing a value of the measurement, the method comprising the following steps:

detecting the output signal output by the MEMS sensor;

selecting one or more respective frequency components of the output signal that correspond to one or more respective resonance frequencies of elements of the MEMS sensor;

performing a comparison to determine whether at least one amplitude of the selected one or more respective frequency components is higher than a predefined non-zero threshold;

responsive to a result of the comparison being that the at least one amplitude is higher than the predefined non-zero threshold, determining that the output signal is attributed at least in part to an external acoustic attack and therefore unreliable for indicating the value of the measurement; and due to the determined unreliability of the output signal due to the attribution of the output signal at least in part to the external acoustic attack: (i) discarding the output signal entirely as an indication of the measured characteristic, or (ii) reducing a weighting of the output signal as a whole as the indication of the measured characteristic, or (iii) outputting a warning about the unreliability of the output signal as a whole as the indication of the measured characteristic, or (iv) storing an item of information indicating the unreliability of the output signal as a whole as the indication of the measured characteristic.

14. The method as recited in claim 13, wherein the output signal is discarded for the control when the output signal is determined to be unreliable.

\* \* \* \* \*